United States Patent [19]
Westhoff et al.

[11] Patent Number: 5,248,154
[45] Date of Patent: Sep. 28, 1993

[54] BIDIRECTIONAL GASKET

[75] Inventors: James A. Westhoff, Langhorne; James A. Kelly, Warrington, both of Pa.

[73] Assignee: Poly-Tec Products, Inc., Tullytown, Pa.

[21] Appl. No.: 772,574

[22] Filed: Oct. 7, 1991

[51] Int. Cl.$^5$ .................... F16J 15/10; F16L 15/02
[52] U.S. Cl. .......................................... 277/212 FB
[58] Field of Search ............... 277/212 FB, 101, 152, 277/153, 165, 166, 186, 207 A; 285/230, 110, 910

[56] References Cited

U.S. PATENT DOCUMENTS

| | | | |
|---|---|---|---|
| 3,163,432 | 12/1964 | De Boer | 285/110 X |
| 3,857,589 | 12/1974 | Oostenbrink | 277/207 A X |
| 4,103,901 | 8/1978 | Ditcher | 277/9.5 |
| 4,333,662 | 6/1982 | Jones | 285/230 X |
| 4,342,462 | 3/1982 | Carlesimo | 277/101 |
| 4,350,351 | 9/1982 | Martin | 285/230 X |
| 4,387,900 | 6/1983 | Ditcher et al. | 285/230 X |
| 4,598,915 | 7/1986 | Gilbert | 277/166 X |
| 4,732,397 | 3/1988 | Gavin | 277/207 A |
| 4,832,438 | 2/1974 | Ditcher | 264/274 |
| 4,903,970 | 2/1990 | Ditcher et al. | 277/101 X |
| 5,054,794 | 10/1991 | Westhoff et al. | 285/230 X |
| 5,114,162 | 5/1992 | Ditcher | 277/207 A |

FOREIGN PATENT DOCUMENTS

| | | | |
|---|---|---|---|
| 2304676 | 8/1973 | Fed. Rep. of Germany | 277/207 A |
| 0237203 | 7/1986 | German Democratic Rep. | 277/207 A |
| 1546761 | 5/1979 | United Kingdom | 277/152 |

Primary Examiner—William A. Cuchlinski, Jr.
Assistant Examiner—James K. Folker
Attorney, Agent, or Firm—Louis Weinstein

[57] ABSTRACT

A gasket for providing a watertight seal between an opening and a cast member and a conduit extending into said cast member, the gasket being an annular member having an outer circumferential portion of inverted T-shaped cross-section for embedment into the opening of the cast member and a flexible web-like portion extending inwardly from said anchoring portion and terminating in an annular enlarged beaded portion. The length of the web is greater than the distance between the outer diameter of the beaded portion and the inner diameter of the anchoring portion to form a curved configuration. The beaded portion has an inner diameter adapted to cause the beaded portion to undergo at least slight expansion when a conduit is pushed through the central opening defined by the beaded portion whereby the over-center position of the beaded portion may be reversed simply by movement of the pipe. An intermediate annular portion of the web is of increased thickness to form an anti-balloon annular section which serves to retain the shape of the center of the gasket and avoids the necessity of making the web of the gasket too thick.

6 Claims, 3 Drawing Sheets

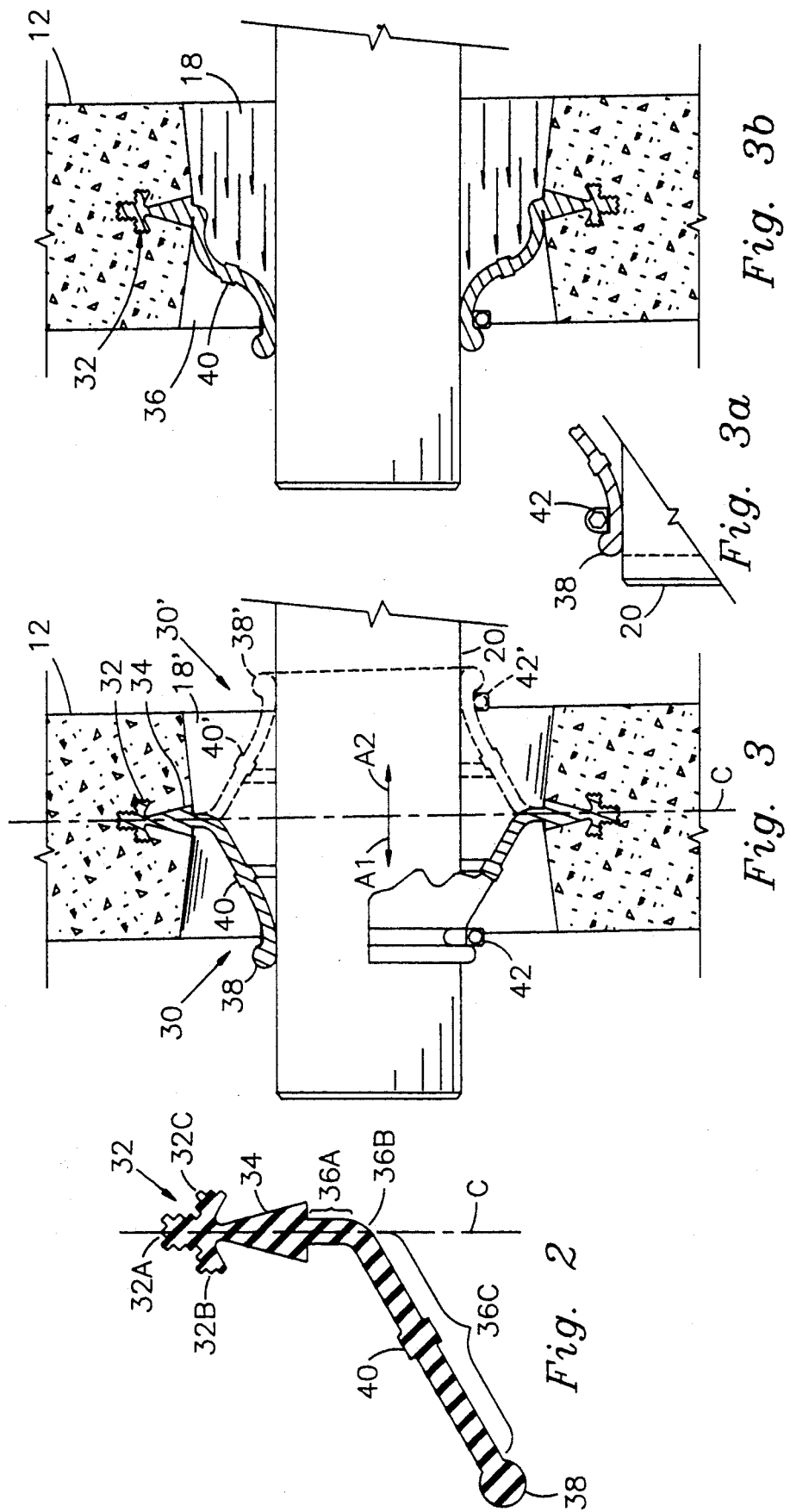

BIDIRECTIONAL GASKET

FIELD OF THE INVENTION

The present invention relates to gaskets for providing a watertight seal in manhole assemblies and the like, and more particularly, to a novel anti-balloon gasket capable of being moved to either one of two over-center positions simply by movement of the conduit extending through the inner opening of the gasket.

BACKGROUND OF THE INVENTION

Elastomeric molded gaskets have been conventionally used for resiliently supporting a sewer pipe in an opening through the wall of a manhole, for example. Such gaskets provide a watertight seal, closing the space between the wall of the opening and the pipe.

Extruded gasket rings described in U.S. Pat. Nos. 3,813,107, 3,796,406 and 3,832,438 have been utilized for supporting sewer pipes of substantial size by means of a gasket having a hollow nose section integral with a base member which is embedded in the manhole when cast. Such gaskets are made by cutting a length of a linear extrusion to a size corresponding to the circumference of the pipe, curving the cut length into the form of a cylinder, joining the ends and flattening the wall to produce a disk-like washer-type gasket which must be held against considerable internal stress until the cast material sets. The strains involved in producing gaskets of relatively small diameter, such as of the order of four (4) to six (6) inches, limits the use of small diameter sizes.

Another type of gasket is the molded gasket which is shaped like an ordinary washer, i.e. is comprised of an apertured disk lying in a single plane having its outer margin embedded in the cast material and lies in a plane which is substantially perpendicular to the axis of the pipe extending through the gasket. These gaskets have limited stretch in the outward radial direction and even though the gaskets can be made with an undersized hole so that the pipe will stretch the material on being inserted, the amount of stretch is insufficient, in the plane of the gasket to provide enough freedom for distortion in order to preserve a tight seal.

Molded gaskets of the above-mentioned type also are limited as to the amount of deflection which a conduit may undergo from a nominal desired position of alignment and further have limited ability to accommodate large variations in pipe diameter which is disadvantageous for a number of applications.

A gasket which solves some of the above problems is described in U.S. Pat. No. 4,103,901, issued Aug. 1, 1978 and assigned to the assignee of the present invention. The gasket described in this patent is sufficiently resilient to compensate for shear stress, is sufficiently flexible to accommodate extensive misalignment of the pipe and yet is capable of affording an absolutely fluid tight seal in the rim of the opening and is easy to install, comparatively inexpensive to manufacture and has a long useful operating life.

The gasket of U.S. Pat. No. 4,103,901 has a peripheral flange structure which is embedded into the cast material and comprises an outer band and an integral radially extended web forming a substantially T-shaped configuration. The gasket extends inwardly therefrom defining an outer skirt portion which is reversibly angled to form an inner skirt portion integrally joined to the outer skirt portion at a pleat or fold. The inner skirt extends generally diagonally inwardly from the fold toward the center of the gasket and terminates in a annular-shaped beaded inner end of an O-ring configuration. The gasket, however, is unidirectional in that the conduit inserted into the gasket opening can only be pushed in one direction. The "memory" of the gasket is such that the pleat or fold is not capable of being reversed so as to enable the O-ring portion of the gasket to be selectively positioned on either of two "over-center" positions relative to an imaginary intermediate position. More specifically, the pleat is molded into the gasket in such a manner as to be incapable of being reversed.

U.S. Pat. No. 4,903,970, issued Feb. 27, 1990 and assigned to the assignee of the present invention discloses a gasket arrangement in which the gasket is capable of being moved between a folded or pleated condition to an unfolded condition achieved by providing two skirt portions of unequal length which enable the gasket to be folded or unfolded but does not permit the gasket to be folded in the same manner either of two opposing directions.

All of the above designs suffer from the disadvantages of being incapable of being easily moved to either of two over-center positions and to either of two opposing folded states.

BRIEF DESCRIPTION OF THE INVENTION

The present invention provides a novel gasket for use in manhole assemblies and the like which is characterized by comprising a unique design which enables the gasket skirt to be folded in either direction and which enables the central O-ring to be positioned in either of two opposing "over-center" positions relative to an imaginary centerline passing through the gasket and perpendicular to the central axis of the gasket. The gasket of the present invention is a molded member comprised of an outer annular-shaped anchoring portion having a substantially inverted T-shaped cross-section for embedment in a cast member, typically an opening in a manhole base. An integral tapered portion extends inwardly from the anchoring portion toward the central axis of the molded gasket and is also adapted to be embedded in the cast material. The tapered portion merges with a gasket skirt which extends radially inwardly for a short distance and then curves diagonally downwardly toward the central axis of the gasket, said skirt terminating in a central opening defined by an enlarged bead having a circular cross-section and defining the shape of an O-ring.

The diagonally aligned portion of the skirt is provided with an annular ring-shaped portion of increased thickness which serves as an anti-balloon portion which prevents the gasket from being unduly expanded due to the presence of water under pressure on one side of the gasket. The ballooning arrangement permits the remainder of the skirt to be of a significantly reduced thickness thereby reducing the weight and amount of gasket material while retaining the flexibility of the gasket skirt.

The O-ring is designed to experience some expansion when receiving the conduit to be extended therethrough sufficient to cause the O-ring portion to grip the outer periphery of the conduit which may then be moved in either direction to change the over-center position of the O-ring portion relative to the imaginary central axis of the gasket. The watertight seal between the gasket and the conduit is enhanced by application of a tension clamp.

OBJECTS OF THE INVENTION

It is therefore one object of the present invention to provide a novel gasket for providing a watertight seal between an opening in a wall and a conduit and in which the central portion of the gasket gripping the conduit may be simply and readily moved to either of two over-center positions.

Still another object of the present invention is to provide a novel gasket for providing a watertight seal between an opening in a wall and a conduit extending therethrough in which the gasket is provided with a skirt portion having a substantially uniform thickness and having a ring-shaped portion thereof of increased thickness to prevent the skirt portion from ballooning.

Still another object of the present invention is to provide a novel gasket for providing a watertight seal between a conduit and an opening in a wall in which the gasket is provided with an outer peripheral portion which is embedded into the cast member and has a flexible skirt portion terminating in an O-ring shaped inner portion for embracing the conduit, said skirt portion having a ring-shaped portion of increased thickness to prevent ballooning of the skirt portion while at the same time providing a skirt of increased flexibility.

The above, as well as other objects of the invention, will become apparent when reading the accompanying description and drawing, in which:

BRIEF DESCRIPTION OF THE FIGURES

FIG. 2 shows an enlarged sectional view of the gasket of FIG. 1 looking in the direction of arrows 2—2';

FIG. 3 shows a sectional view of a gasket installed in an opening and which is useful for explaining the operation of a preferred embodiment thereof;

FIG. 3a is a sectional view of a portion of the gasket shown in FIG. 3 showing the manner in which the watertight seal with a conduit is enhanced;

FIG. 3b is a sectional view of a portion of the installed gasket which is provided to explain the anti-ballooning effect obtained from the gasket;

DETAILED DESCRIPTION OF THE INVENTION AND PREFERRED EMBODIMENTS THEREOF

Figure 1:
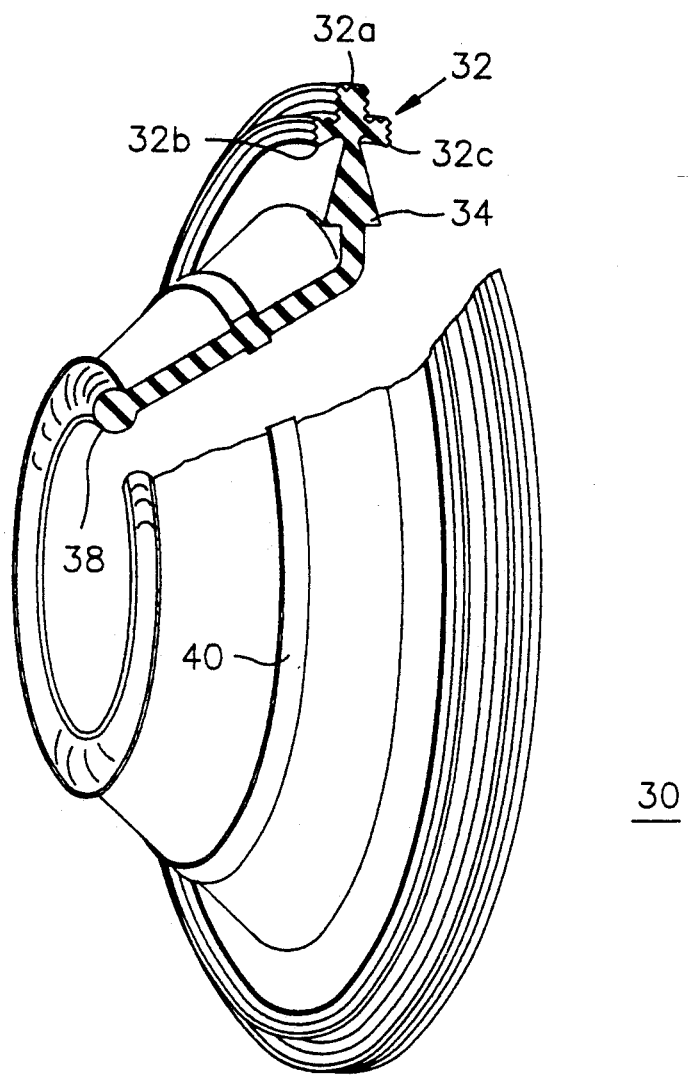
FIG. 1 shows a perspective view of a gasket designed in accordance with the principles of the present invention.

FIG. 1 shows a perspective view of a gasket 30, partially sectionalized and embodying the principles of the present invention. Gasket 30 is adapted to be embedded in a sidewall opening such as is shown in FIG. 4.

Figure 4:
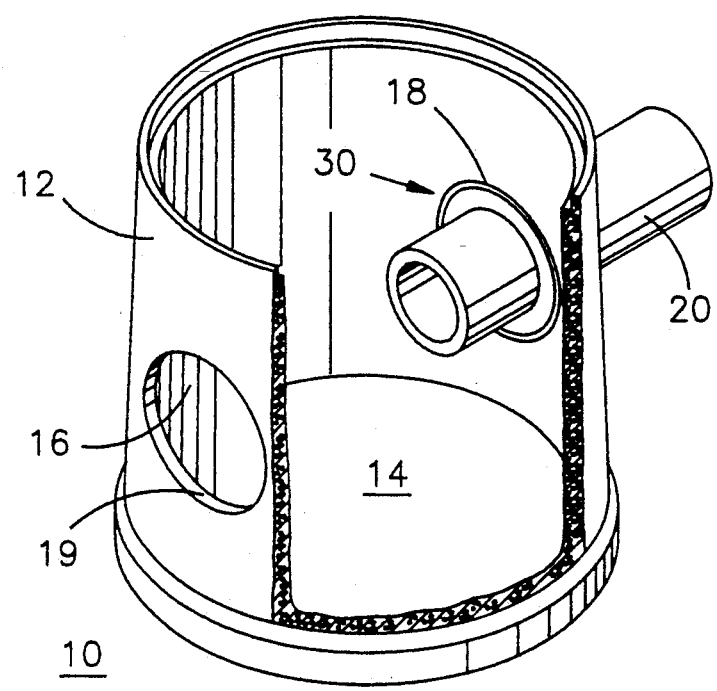
FIG. 4 shows a perspective view of a manhole base portion, partially sectionalized showing the manner in which the gasket of the type shown in FIGS. 1-3 is utilized to provide a watertight seal between the manhole base and a conduit extending therethrough.

FIG. 4 shows a manhole base 10 comprised of a cylindrical-shaped sidewall 12 integrally joined at its lower end to a floor 14. Manhole base 10 has openings 16, 18 typically formed during casting, or alternatively, formed by conventional coring techniques. Each opening receives a pipe or conduit such as, for example, conduit 20. Manhole base 10 may be entered for maintenance, inspection and repair as is conventional.

Gasket 30 is cast into opening 18 using conventional casting techniques, for example, and is positioned between opening 18 and conduit 20, providing a watertight seal. The gasket is yieldable to allow for movement of the conduit 20 due to vibration, settling or the like.

FIG. 1 shows a perspective partially sectionalized view and FIG. 2 shows a more detailed sectional view of gasket 30 which is comprised of an outer inverted T-shaped anchoring portion 32 comprised of radially directed portion 32a and outwardly extending projections 32b, 32c defining the inverted T-shaped anchoring portion 32. The surfaces of portions 32a, 32b and 32c making up the inverted T-shaped anchoring section 32 have a ribbed or saw-toothed contour as shown best, for example, in FIG. 2 to facilitate the securement of the anchoring portion within the cast material. Imaginary symmetry centerline C passes through the center of projection 32a, tapered portion 34 and portion 36a of skirt 36. Projections 32b and 32c lie on opposite sides of and are equidistant from centerline C. The gasket extends inwardly from the periphery forming an integral tapered portion 34 which is joined at its inner end to skirt 36 having a portion 36a aligned with and symmetrical about the imaginary centerline C and curved at 36b, the remaining portion 36c of skirt 36 extending diagonally downward and inward from portion 36a and terminating in an enlarged beaded portion defining an O-ring shaped central portion 38. Skirt 36 is of a substantially uniform thickness except for the increased annular-shaped anti-balloon portion 40 which is of annular shape and of increased thickness relative to the remainder of skirt 36.

The gasket is preferably formed of a suitable elastomeric material which meets the ASTM specifications. Suitable elastomers conform to ASTM C-923 and can be made in base polymers of E.P.D.M., polyisoprene, nitrile, or neoprene, for example.

The length of skirt 36 measured along centerlines C and C1 (FIG. 2) is much greater than the distance between the tapered portion 34 and the intersection of the central axis A1, A2 (FIG. 3) of gasket 30 and centerline C, causing the gasket to assume either of two "over-center" positions 30 and 30' as will be described in detail in connection with FIG. 3.

FIG. 3 shows a gasket 30 installed within opening 18, for example, of a manhole base 12. The inverted T-shaped anchoring portion 32 is embedded within the cast material in the region surrounding opening 18 as is tapered portion 34. The tapered portion terminates substantially at the inner periphery of opening 18 enabling skirt 36 to extend away from the inner periphery of opening 18 in the manner shown. The gasket is preferably cast into the manhole base employing appropriate mold rings similar to the type shown, for example, in U.S. Pat. No. 4,103,901 and specifically in FIG. 4 thereof. The size of the opening defined by O-ring portion 38 relative to conduit 20 is such that conduit 20 is embraced by the O-ring portion 38 as shown. Assuming that the conduit is external to the manhole base 10 and is pushed into opening 18 by moving conduit 20 from the right toward the left as shown by arrow A1, the O-ring portion 38 ultimately embraces the conduit and occupies the solid line position 38 shown in FIG. 3. Assuming that the conduit 20 is positioned within the interior region of manhole base 10 and is pushed through opening 18 in moving from the left to the right as shown by arrow A2, O-ring portion 38 embraces the conduit and is pushed from the solid line over-center position 38 through the imaginary symmetry centerline C to the right-hand over-center position shown by the dotted gasket 30' and O-ring portion 38'. Assuming that after the conduit is pushed from left to right and it is then desired to have the gasket occupy the solid line position 30, the conduit is moved in the direction shown by arrow A1 causing the gasket to assume the solid line position 30 shown in FIG. 3. Assuming that the desired position for the gasket is the solid line position 30 shown in FIG. 3, a conventional tension clamp 42 may be placed about gasket 30 immediately adjacent O-ring portion 38 as shown in FIG. 3a in order to enhance the watertight seal.

FIG. 3b shows an arrangement in which pressure from subsurface water causes the gasket skirt 36 to bulge in the manner shown in FIG. 3b. The anti-balloon section 40 of increased thickness prevents the skirt 36 from stretching, enabling the skirt portion 36 to maintain its integrity and prevents the skirt 36 from becoming distorted. The anti-balloon section 40 also retains its circular shape causing the skirt to retain its circularity. Providing an anti-balloon section 40 further enables the skirt portion 36 to retain its flexibility thereby enabling the gasket to be readily moved from either of the two over-center positions 30 and 30' shown in FIG. 3. The gasket is designed so that it can be installed with a manhole opening in either of the solid or dotted line orientations 30 and 30' shown in FIG. 3a without any reduction in effectiveness and permits the gasket to be moved to either side of the centerline C. The gasket may likewise be clamped in either the solid or dotted line position 30 or 30' utilizing a conventional tension clamp, for example, in the same manner as is shown in FIG. 3b. The reduced thickness of the gasket in the region of the tension clamp also enhances the intimate, watertight engagement of the gasket skirt with the outer periphery of conduit 20.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A moldable, annular-shaped, elastomeric gasket for resiliently supporting a conduit in an opening within a wall and watertightly sealing the space between the wall and the conduit, said gasket having a central axis and comprising:
    an outer annular anchoring portion whereby a symmetry centerline passes through said anchoring portion which is symmetrical about said centerline, said centerline being substantially perpendicular to the central axis of said gasket;
    an annular joining portion having a tapered cross-section extending radially inward from and integral with said anchoring portion so that its longitudinal axis is aligned with and symmetrical about said symmetry centerline, the end of said taper joined to said anchoring portion and being less than an end of said taper closer to the central axis of the gasket;
    an annular skirt portion having an outer end joined to and integral with said tapered joining portion, said skirt portion having an outer annular portion which is symmetrical to said centerline and having a second inner portion which is aligned diagonally relative to said centerline prior to insertion of a conduit;
    said skirt portion terminating in an enlarged annular-shaped beaded O-ring portion defining an annular central opening in said gasket for receiving a conduit therethrough;
    the central axis of said gasket intersecting said symmetry centerline;
    the length of said skirt measured between said tapered portion and said O-ring portion being greater than the distance between said O-ring portion and said tapered portion measured along said centerline, causing said skirt to stably assume either one of two over-center positions on opposite sides of said centerline whereas the outer portion of said skirt remains substantially symmetrical to said centerline, prior to the insertion of a conduit;
    said O-ring portion being of a size adapted to embrace and engage the outer periphery of a conduit extending therethrough enabling the gasket to be moved to either of said two over-center positions by movement of the conduit embraced and engaged by said O-ring portion
    said skirt having a substantially uniform thickness;
    an annular portion of said skirt intermediate said tapered portion and said O-ring portion being of increased thickness and extending outwardly equal distances from a pair of opposing sides of said skirt to form an anti-balloon section which limits the expansion of the gasket skirt due to water pressure applied thereto while at the same time facilitating the flexibility of the skirt.

2. The gasket of claim 1 wherein the anchoring portion is provided with integral projections extending in opposite directions away from said symmetry centerline and cooperating with the anchoring portion to form an inverted T-shaped anchoring section said section have a ribbed outer surface to enhance the securement of the anchoring section within a cast member.

3. The gasket of claim 1 further comprising a tension clamp mounted about the skirt portion of said gasket adjacent said O-ring portion to enhance the watertight seal between the gasket and a conduit extending therethrough.

4. The gasket of claim 1 wherein said anchoring portion has an inverted T-shaped cross-section defined by a first projection aligned with said centerline and second and third projections transverse to said centerline and extending in opposite directions from said first projection.

5. The gasket of claim 1 wherein said gasket is formed of a yieldable, expandable rubber or an elastomeric.

6. The gasket of claim 1 wherein said anti-balloon section is at a location which is displaced from an outer surface of said conduit passing through the gasket.

* * * * *